(12) United States Patent
Sano

(10) Patent No.: US 11,067,447 B2
(45) Date of Patent: Jul. 20, 2021

(54) ANALYSIS APPARATUS, IMAGING SYSTEM, AND STORAGE MEDIUM

(71) Applicant: CANON KABUSHIKI KAISHA, Tokyo (JP)

(72) Inventor: Daisuke Sano, Moka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 131 days.

(21) Appl. No.: 16/382,251

(22) Filed: Apr. 12, 2019

(65) Prior Publication Data

US 2019/0323889 A1 Oct. 24, 2019

(30) Foreign Application Priority Data

Apr. 23, 2018 (JP) .............................. JP2018-082119

(51) Int. Cl.
*G01J 3/28* (2006.01)
*G01N 21/25* (2006.01)
*G01N 21/31* (2006.01)

(52) U.S. Cl.
CPC .......... *G01J 3/2823* (2013.01); *G01N 21/255* (2013.01); *G01J 2003/2826* (2013.01)

(58) Field of Classification Search
CPC .... G01J 2003/2826; G01J 3/28; G01J 3/2823; G01N 21/255; G01N 21/31; G01N 2201/1293
See application file for complete search history.

(56) References Cited

U.S. PATENT DOCUMENTS

| 6,266,211 B1 * | 7/2001 | Thomas, III | G06K 7/12 360/133 |
| 2013/0135743 A1 | 5/2013 | Sano | |
| 2017/0195047 A1 * | 7/2017 | Kato | H04N 9/04517 |

FOREIGN PATENT DOCUMENTS

| JP | 2000214091 A | 8/2000 |
| JP | 2008051654 A | 3/2008 |
| JP | 2012242271 A | 12/2012 |
| WO | 2013099928 A | 7/2013 |

* cited by examiner

*Primary Examiner* — Hina F Ayub
(74) *Attorney, Agent, or Firm* — Carter, DeLuca & Farrell LLP

(57) ABSTRACT

An analysis apparatus includes an estimator configured to estimate spectral information of an object based on information acquired by a spectroscope, and a processor configured to tag the spectral information of the object with a feature amount of the object. The estimator performs different estimation processing for each of a plurality of spectroscopes, and the processor performs regression processing common to the plurality of spectroscopes.

14 Claims, 10 Drawing Sheets

ANALYSIS APPARATUS, IMAGING SYSTEM, AND STORAGE MEDIUM

BACKGROUND OF THE INVENTION

Field of the Invention

The present invention relates to an analysis apparatus that analyzes a feature amount of an object using spectral (or spectroscopic) information.

Description of the Related Art

One conventionally known method analyzes a feature amount of an object based on spectral information acquired by a spectroscope such as a hyper-spectral camera or a multispectral camera. Japanese Patent Application Laid-Open No. 2000-214091 discloses a method of analyzing a feature amount of an object based on spectral information by tagging the spectral information with the feature amount of the object.

The relationship between the spectral information and the feature amount of the object differs according to the type of the spectroscope used to acquire the spectral information. It is thus necessary to construct for each spectroscope the analysis apparatus that analyzes the feature amount of the object. As a result, due to the arduous construction of the analysis apparatus, the feature amount of the object cannot be efficiently analyzed.

SUMMARY OF THE INVENTION

The present invention provides an analysis apparatus, an imaging system, and a storage medium, each of which can easily and efficiently analyze an object.

An analysis apparatus according to one aspect of the present invention includes an estimator configured to estimate spectral information of an object based on information acquired by a spectroscope, and a processor configured to tag the spectral information of the object with a feature amount of the object. The estimator performs different estimation processing for each of a plurality of spectroscopes, and the processor performs regression processing common to the plurality of spectroscopes. An imaging system according to another aspect of the present invention includes the above analysis apparatus and the spectroscope.

A non-transitory computer-readable storage medium according to another aspect of the present invention storing a program that causes a computer to execute a method that includes the steps of estimating spectral information of an object based on information acquired by a spectroscope, and tagging the spectral information of the object with a feature amount of the object. The estimating step performs different estimation processing for each of a plurality of spectroscopes, and the tagging step performs regression processing common to the plurality of spectroscopes.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

Figure 1A:
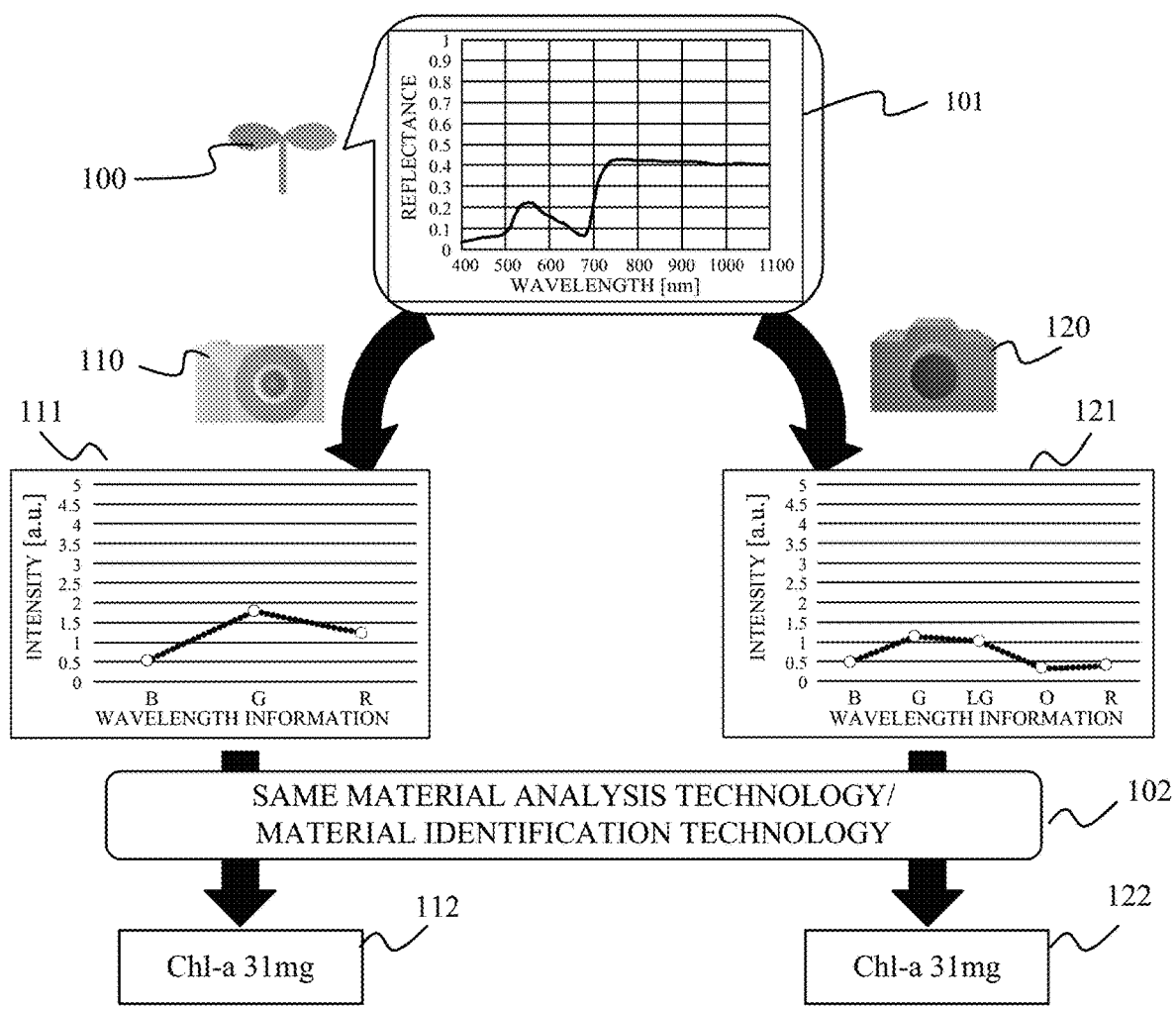
FIGS. 1A and 1B explain an analysis apparatus according to each embodiment.
Figure 1B:
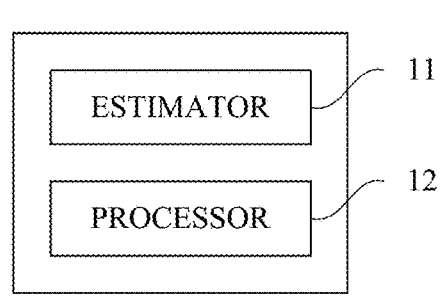

Referring now to FIGS. 1A and 1B, a description will be given of a concept of an analysis apparatus according to this embodiment. FIGS. 1A and 1B are explanatory diagrams of the analysis apparatus. FIG. 1A is a conceptual diagram of the analysis apparatus, and FIG. 1B is a block diagram of the analysis apparatus. This embodiment uses an imaging apparatus (camera) having an image sensor as the spectroscope configured to acquire the information (first spectral information, acquired information). The first spectral information acquired by the spectroscopes is an image (image data) captured by the imaging apparatus. However, the present invention is not limited to this embodiment, and the spectroscope other than the imaging apparatus may be used as long as spectral information is available.

In FIG. 1A, reference numeral 100 denotes an object (a pair of leaves as an object), and reference numeral 101 denotes a spectrum of the object 100 (second spectral information, object information). In the spectrum 101, an abscissa axis represents a wavelength, and an ordinate axis represents a reflectance. The spectrum 101 can be accurately evaluated, for example, by a spectrum measuring system using a darkroom, and can be handled as a correct value of the spectral characteristic of the object 100.

Reference numerals 110 and 120 denote cameras (imaging apparatuses) as spectroscopes configured to acquire spectral information. The cameras 110 and 120 are different types of cameras. In this embodiment, the camera 110 divides the wavelength into three, and the camera 120 divides the wavelength into five. Reference numeral 111 denotes spectral information acquired by capturing the object 100 using the camera 110. Reference numeral 121 denotes spectral information acquired by capturing the object 100 using the camera 120. In each of the spectral information 111 and 121, the abscissa axis represents wavelength information and the ordinate axis represents an intensity.

The spectrum 101 thus includes information that is fine in the wavelength direction so that a curve can be displayed.

On the other hand, the spectral information acquired by the cameras 110 and 120 is spectral information rounded to three or five points due to the spectral performances of the cameras 110 and 120. The spectral information 111 and 121 are different from each other in sensitivity to each wavelength as well as the number of wavelengths. Thus, for example, the same "red (R)" information also has different values in each of the cameras 110 and 120.

Reference numerals 112 and 122 denote material amounts obtained through the material analysis to the spectral information 111 and 121, such as chlorophyll amount a. Since the same object 100 is captured, the material amounts 112 and 122 should be the same. In calculating the material amounts 112 and 122 using different spectral information 111 and 121, the prior art needs to develop an identifier suitable for the spectral information 111 and 121, and cannot equally treat the spectral information 111 and 121.

On the other hand, this embodiment uses the material analysis technology 102 for identifying a material based on the spectral information 111 and 121 and can use the same analysis technology and analysis data regardless of the spectral characteristic of the cameras 110 and 120. Thereby, this embodiment can complement the data amount of the material analysis technology 102 among the different cameras 110 and 120 and compare the material amounts acquired by the different cameras 110 and 120 with each other.

As illustrated in FIG. 1B, the analysis apparatus 10 includes an estimator 11 and a processor 12. The estimator 11 estimates the spectral information, such as the spectrum 101, of the object based on the spectral information, such as the spectral information 111 and 121, acquired by the spectroscopes, such as the cameras 110 and 120. The processor 12 tags or associates the spectral information of the object with the feature amount of the object, such as the material amounts 112 and 122. The estimator 11 may estimate the spectral information of the object based on the plurality of pieces of spectral information, such as the spectral information 111 and 121, acquired by the plurality of spectroscopes. However, in this embodiment, the estimator 11 may estimate the spectral information of the object based on the spectral information acquired by a single spectroscope. The feature amount of the object may be property information of the object (information on a component or state of the object such as a sugar content, a color, a chlorophyll amount, etc.).

Figure 2:
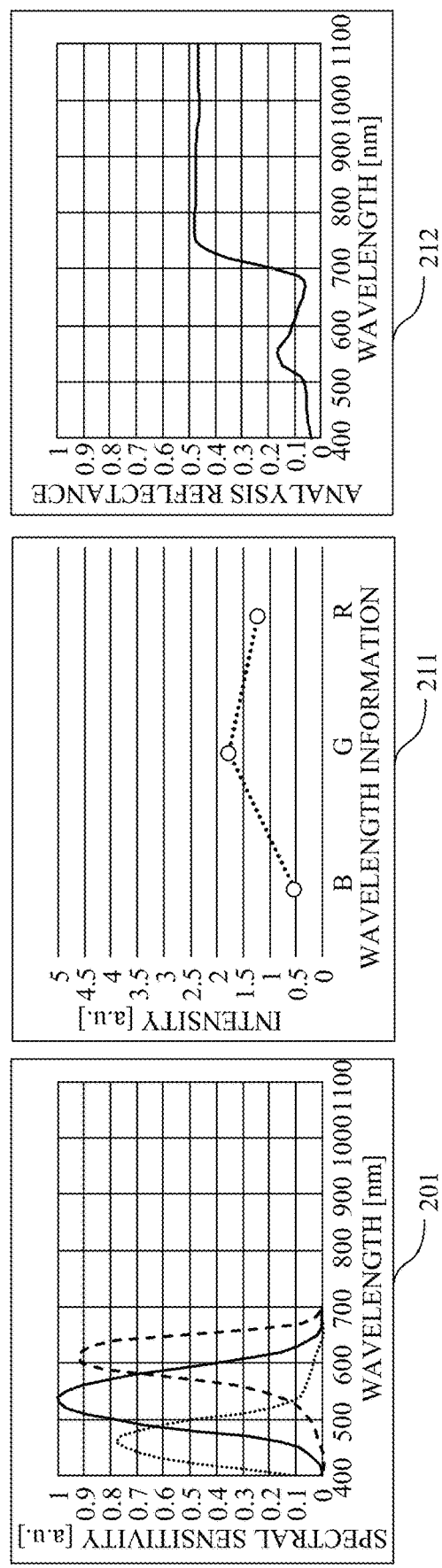
FIG. 2 illustrate a spectral characteristic of a spectroscope according to an example 3, information acquired by the spectroscope, and an estimated spectrum.
Figure 3:
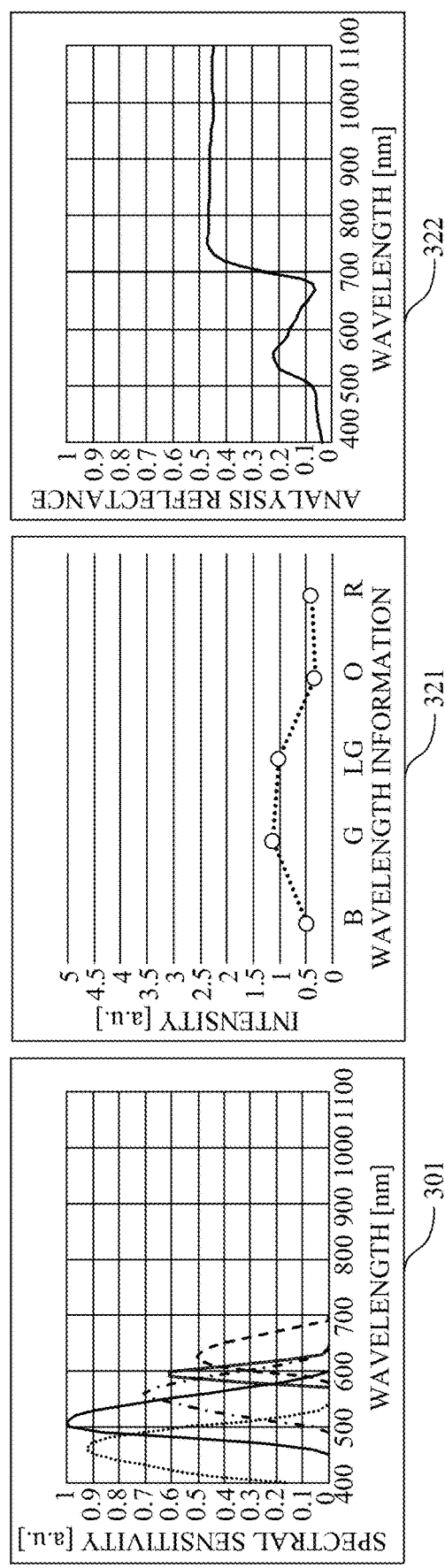
FIG. 3 illustrates a spectral characteristic of a spectroscope according to an example 4, information acquired by the spectroscope, and an estimated spectrum.

Referring now to FIGS. 2 and 3, a description will be given of a specific method for realizing the analysis apparatus in FIGS. 1A and B. FIG. 2 illustrates a spectral characteristic of the camera 110 and spectral information and estimated spectrum when the object 100 is captured. FIG. 3 illustrates a spectral characteristic of the camera 120, and spectral information and estimated spectrum.

In FIG. 2, reference numeral 201 denotes the spectral characteristic of the camera 110, reference numeral 211 denotes the spectral information of the object 100 captured by the camera 1110, and reference numeral 212 denotes the estimated spectrum. In FIG. 3, reference numeral 301 denotes the spectral characteristic of the camera 120, reference numeral 321 denotes the spectral information of the object 100 captured by the camera 120, and reference numeral 322 denotes the estimated spectrum. In each of the spectral characteristics 201 and 301, the abscissa axis represents a wavelength and the ordinate axis represents a spectral intensity. In each of the spectral information 211 and 321 of the object 100, the abscissa axis represents wavelength information and the ordinate axis represents an intensity. In each of the estimated spectra 212 and 322, the abscissa axis represents a wavelength and the ordinate axis represents an analytical reflectance.

The spectrum 101 of the object 100 is rounded to information such as the spectral information 211 and 321 when it is multiplied by the spectral characteristics 201 and 301 of the cameras 110 and 120. The spectral information 211 and 321 may be calculated based on transmittances of the lenses of the cameras 110 and 120, marginal light losses, and the like. Since the acquired spectral information 211 and 321 is calculated based on the different spectral characteristics 201 and 301, it is difficult to compare them as they are. Accordingly, this embodiment converts the spectral information 211 and 321 into the estimated spectra 212 and 322. Thereby, the spectral information of the object 100 can be compared irrespective of the spectral characteristics 201 and 301.

Any methods may be adopted as long as the estimated spectra 212 and 322 can be obtained, but this embodiment describes a method using the characteristics of the multivariate analysis and regression analysis. However, the present invention is not limited to this method, and an estimated spectrum may be obtained using another method.

Figure 4:
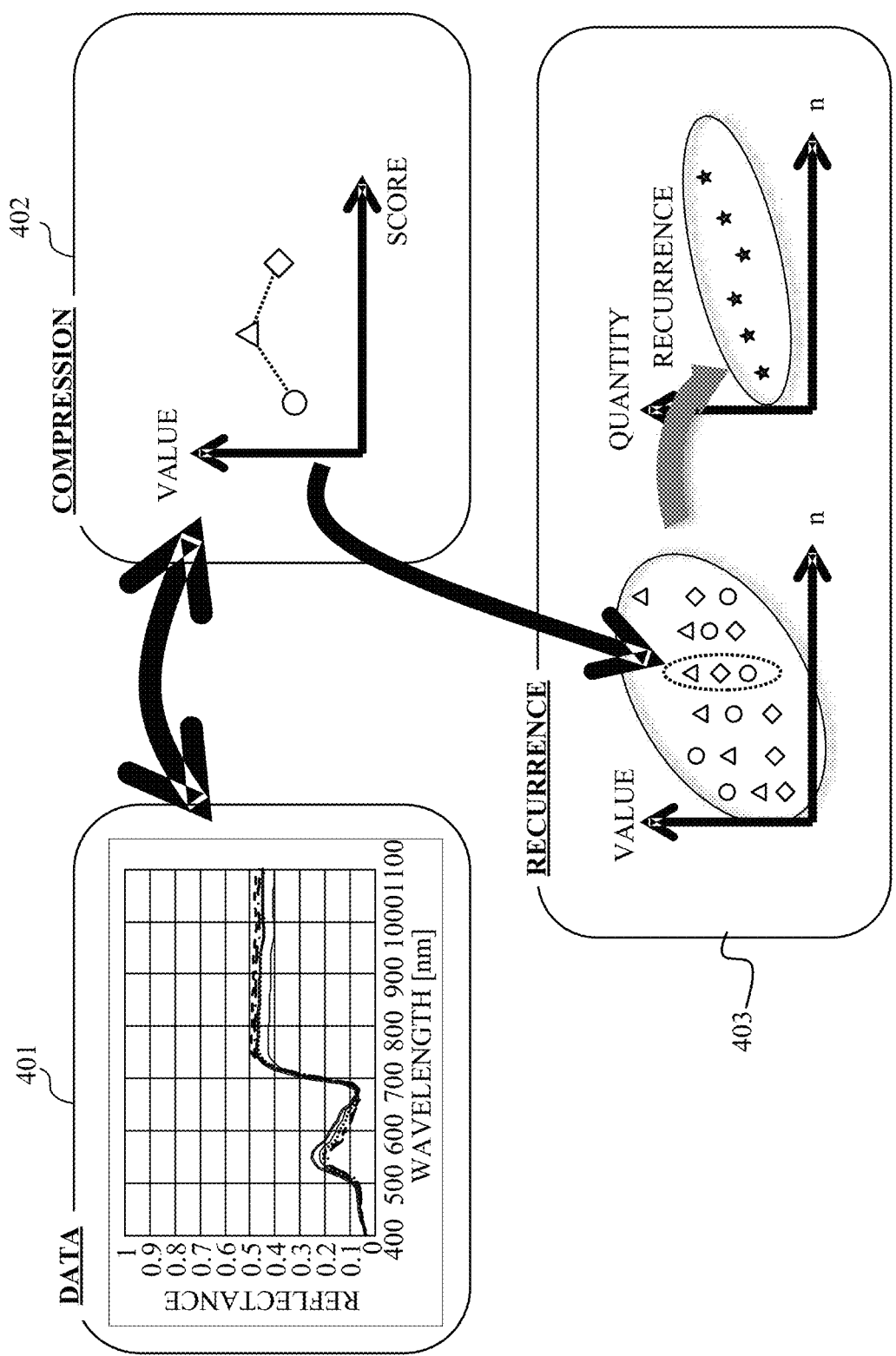
FIG. 4 is a conceptual diagram of a multivariate analysis and regression analysis according to each embodiment.

Referring now to FIG. 4, a description will be given of a method of obtained the estimated spectrum. FIG. 4 is a conceptual diagram of the multivariate analysis and regression analysis. Reference numeral 401 is data (a set of a large amount of original data) containing a plurality of variables. In the data 401, the abscissa axis represents a wavelength and the ordinate axis represents a reflectance.

The multivariate analysis is a technology of analyzing data 401 containing a plurality of variables. In general, many variables make complicate the calculation, and thus the number of variables may be as small as possible while the characteristic of the data 401 is maintained. Accordingly, the data 401 containing a plurality of variables is compressed. Reference numeral 402 is a compression technology for converting multivariable data 401 into three-variable compressed data. The technology available to the compression of the data 401 includes the principal component analysis PCA, the independent component analysis ICA, or sparse coding, etc. These methods described herein can compress the data 401 losslessly.

Reference numeral 403 represents a regression technology (regression analysis). The regression technology 403 is a technology of tagging the data 401 differently compressed for each sample number n by the compression technology 402 with the material amount as teacher information (training dataset). When it is assumed that the original data 401 is the spectrum 101 of the object 100 and has m pieces of wavelength information, $f_n(\lambda)$ corresponding to the data 401 is expressed by the following expression (1).

$$f_n(\lambda) = [a_{1n}\lambda_1, a_{2n}\lambda_2, a_{3n}\lambda_3, \ldots a_{mn}\lambda_m] \quad (1)$$

In the expression (1), n is the sample number, and a coefficient $a_{mn}$ of each wavelength $\lambda_m$ changes for a different number. In the compression technology 402, as expressed by the following expressions (2) and (3), the feature amount expressed by the expression (1) is converted into a form that can be explained by a three-dimensional variable.

$$f_n(\lambda) = t_{1n}p_1 + t_{2n}p_2 + t_{3n}p_3 + \alpha_n \quad (2)$$

$$p_1 = [a_{11}\lambda_1, a_{21}\lambda_2, a_{31}\lambda_3, \ldots a_{m1}\lambda_{m1}] \quad (3)$$

In the expression (2), t is a score of each sample number n. p is a basis vector extracted from a large amount of data represented by the expression (1), and the score t indicates a ratio of the basis. Thus, the score t is calculated for each of basis vectors $p_1$, $p_2$, and $p_3$. In the expression (2), a is a residual that cannot be explained with the basis vector p. The expression (3) is substituted for the expression (2) and the compression is made so that it follows the same expression as the expression (1). The above principal component analysis PCA, the independent component analysis ICA, the sparse coding, or the like can be used to derive the expression (3).

The regression technology 403 can use a variety of regression methods, but the most common linear regression will be exemplified. Where it is assumed that $Chl_n$ is a material amount, such as a chlorophyll amount, to be identified with the sample number n, a relational expression expressed by a linear sum can be shown in the following expression (4).

$$Chl_n = k_1 t_{1n} + k_2 t_{2n} + k_3 t_{3n} \qquad (4)$$

The expression (4) can calculate how the material amount $Chl_n$ as the training dataset is tagged with each score t in n samples.

This embodiment uses a spectrum estimating technology utilizing the characteristics of the multivariate analysis and regression analysis. The spectra 101 of n objects 100 are prepared. The spectra 101 are compressed by the compression technology 402 and each of them is converted into a form that can be described by a small number of variables, such as three variables.

Each spectral information 211 and 321 is calculated where it is assumed that that spectra 101 are captured with the spectral characteristics 201 and 301 of the cameras 110 and 120. The spectral information 211 and 321 is substituted for the expression (4) instead of the material amount (material information) $Chl_n$, and tagged with previously compressed information (data) of the spectrum 101. For example, the camera 110 can acquire information of the three components B, G, and R. The following expression (5) is calculated with the score t of the spectrum 101 and the value of each coefficient k is obtained.

$$B_n = k_{1b} t_{1n} - k_{2b} t_{2n} - k_{3b} t_{3n}$$

$$G_n = k_{1g} t_{1n} - k_{2g} t_{2n} - k_{3g} t_{3n}$$

$$R_n = k_{1r} t_{1n} - k_{2r} t_{2n} - k_{3r} t_{3n} \qquad (5)$$

The value of each coefficient k is previously obtained and the spectral information 211 acquired by the camera 110 is substituted for the left side. As a result, three simultaneous equations can be made for three unknown scores t, and the score t can be calculated. Since the camera 120 has five pieces of spectral information, it is understood that five expressions (5) can be created and the three unknown scores t can be calculated. Once the score t is calculated, the estimated spectra 212 and 322 can be obtained by the invertible transformation which is one characteristic of the compression technology 402.

The thus obtained estimated spectra 212 and 322 have the same information shape regardless of the spectral characteristics 201 and 301 of the cameras 110 and 120. Accordingly, once the desired material analysis technology can be formed based on the information of the estimated spectra 212 and 322, a common material analysis technology can be applied to the cameras 110 and 120. One major characteristic is that the imaging apparatus sensitive only to the visible region such as the cameras 110 and 120 can restore data in the wavelength range of the spectrum (data 401) previously used for the learning. Hence, the cameras 110 and 120 can estimate the spectrum in the near-infrared region (700 to 1100 nm) as in the estimated spectra 212 and 322.

In general, the material analysis needs to prepare a large amount of data tagged with training dataset as described above. Conventionally, when different information is acquired by a camera or a spectroscope, it is necessary to collect training dataset individually suitable for each spectral information 211 and 321.

On the other hand, the material analysis technology utilizing the estimated spectrum according to this embodiment can analyze a material using the same training dataset regardless of the spectral characteristic of the spectroscope or the camera. Hence, the training dataset available to the material analysis can be efficiently increased without depending on the spectroscope. When a new spectroscope can compare the spectroscopic characteristics 201 and 301 with the information previously acquired by different spectroscopes and analyze the material, even if these information are not derived by the same hardware.

A variety of methods are applicable so as to identify the material using the estimated spectra 212 and 322. For example, as described above, the multivariate analysis technology, machine learning, deep learning and the like are applicable. Characteristically, these methods maintain the essential process of finally tagging the features of the estimated spectra 212 and 322 with the training dataset. On the other hand, the score t obtained in the course of the spectral estimation has the same meaning as the coefficient obtained by compressing the estimated spectra 212 and 322, and therefore represents the feature amount itself. This embodiment may again perform the material regression in the stage of obtaining the score t, even if the estimated spectra 212 and 322 are not obtained. This embodiment refers to a coefficient representative of the wavelength characteristic of each of the estimated spectra 212 and 322 as a spectral coefficient, such as a score t.

This embodiment obtains the estimated spectra 212 and 322 based on the previously prepared spectrum 101 of the object 100, and cannot derive the correct spectrum for a different objects. However, the gist of this embodiment is not the estimation of the correct spectrum 101, but the evaluation of different spectral information 211 and 321 in the same manner with the same dimension. Hence, as long as the conversion is compatible with the comparison, it is unnecessary to use the spectrum 101 of the correct object 100. For example, in comparing the spectral information of rice leaves, there is no practical problem to use the spectrum 101 of a camellia leaf.

In the calculation, this embodiment uniformly applies the same coefficient k using the spectral information 211 and 321 acquired by the cameras 110 and 120. On the other hand, all objects acquired by the cameras 110 and 120 are not always the same object 100. Whether or not the spectral information 211 and 321 is the predetermined object 100 may be determined and the spectrum may be estimated. In order to recognize the object, a general image recognition technology or the like can be used. This embodiment enables a recognition using the score t obtained by the expression (5) as it is.

Figure 5:
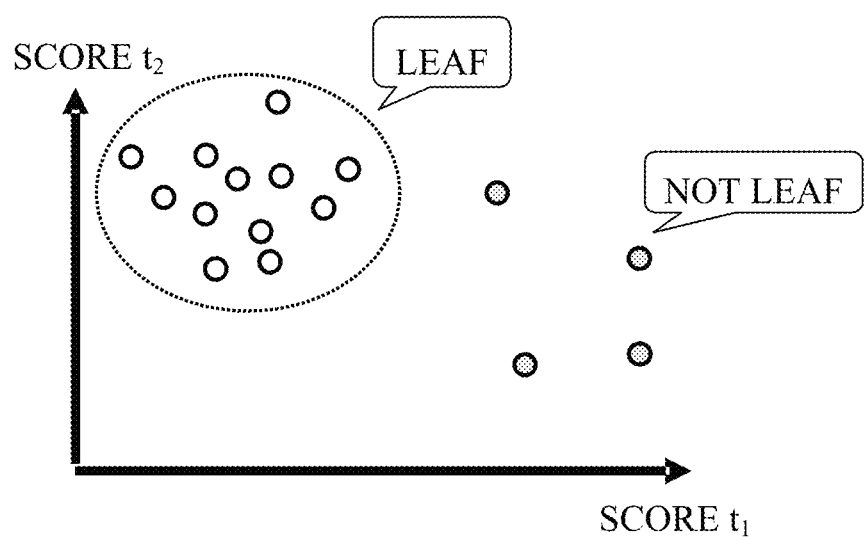
FIG. 5 is a conceptual diagram of a recognition technology according to each embodiment.

FIG. 5 is a conceptual diagram of the recognition technology. The score t obtained by the expression (5) is the spectral coefficient itself and thus a coefficient that directly shows the feature in the wavelength direction. Thus, setting the range of the score t enables a determination of whether or not the feature falls within the conceived range of the object 100 as it is. A technology such as the SVM, the logistic regression, the k-means method, etc. can be used for the recognition technology. This embodiment can omit an arduously development of another recognizer for the cameras 110 and 120, use the recognition technology based on the estimated spectra 212 and 322 as a reference, and thus meritoriously provide the robustness. This embodiment can easily and accurately recognize the object 100 using the estimated spectra 212 and 322 and the obtained spectral coefficient (score t).

Numerical examples will be shown below which relate to the spectral characteristics (spectrum 101) at the wavelength of 400 nm to 1100 nm, the derived basis vectors $p_1$, $p_2$, and $p_3$, an average value Pave for each wavelength, and a coefficient a. The leaf data of the spectrum 101 is used as training dataset. The actual analysis needs to use a large amount of training dataset, but the spectrum 101 is used for the analysis as one of the large number of data. In applying the compression technology 402, an averaging process may be performed for each variable and an average value is set to 0 for each variable of the data 401. The compression technology 402 obtains the feature amount of data and the axial direction having a large variable amount on the basis of the 0 point in calculating the basis vector p. Unless the average value is set to 0, the average scattering influence directly affects the feature value derivation, and thus the average value may be used.

As will also be described in each of the following examples, the average value of the material amount may be set to 0 in the regression technology 403. The fluctuation of the material amount is also represented by positive and negative by averaging the material amount. This is convenient because the feature amount derived by the compression technology 402 is obtained with positive and negative values with respect to 0. An average value for averaging these values can be processed as a constant term in this embodiment. Let the average value be a constant term and the compressed representation value be a variable term. Then, the influence of the variable term is large in order to identify the feature, and the influence of the constant term is large in order to represent the absolute value of the material amount. Accordingly, this embodiment may provide estimation processing based on a remaining variable term (the variable term obtained by excluding the constant term) obtained by subtracting (excluding) a constant term exceeding 30% of the absolute value (different depending on the wavelength) from the spectral information acquired by the spectroscope. As described above, the constant term can use the average value etc., and efficiently extract the variable term by the difference processing. The absolute value of the variable term may be smaller than the absolute value of the constant term In this embodiment, the estimator 11 may perform different estimation processing for each of the plurality of spectroscopes, and the processor 12 performs regression processing common to the plurality of spectroscopes. The spectral information of the object may be a spectrum of the object. The spectral information of the object may be a spectral coefficient. The spectral coefficient may be a coefficient, such as a score t, representing the wavelength characteristic of the reflection light or the transmission light of the object (the wavelength characteristics of the estimated spectra 212 and 322). The estimator 11 may estimate the spectral coefficient of the object through four arithmetic operations to the spectral information acquired by the spectroscopes. The expression for estimating the spectral coefficient of the object may be tagged by the linear regression, such as the expression (4).

The estimator 11 may estimate the spectral coefficient of the object based on the spectral information acquired by the spectroscope, and estimate the spectrum of the object based on the spectral coefficient of the object through different processing according to the wavelength of the reflection light or the transmission light of the object. The feature amount of the object may be property information of the object (material amount or information indicating a component or state of the object). The processor 12 may determine whether or not the object is a predetermined object based on the spectral information of the object estimated by the estimator 11 (recognition technology). Each example will be described in detail below.

Example 1

Figure 6:
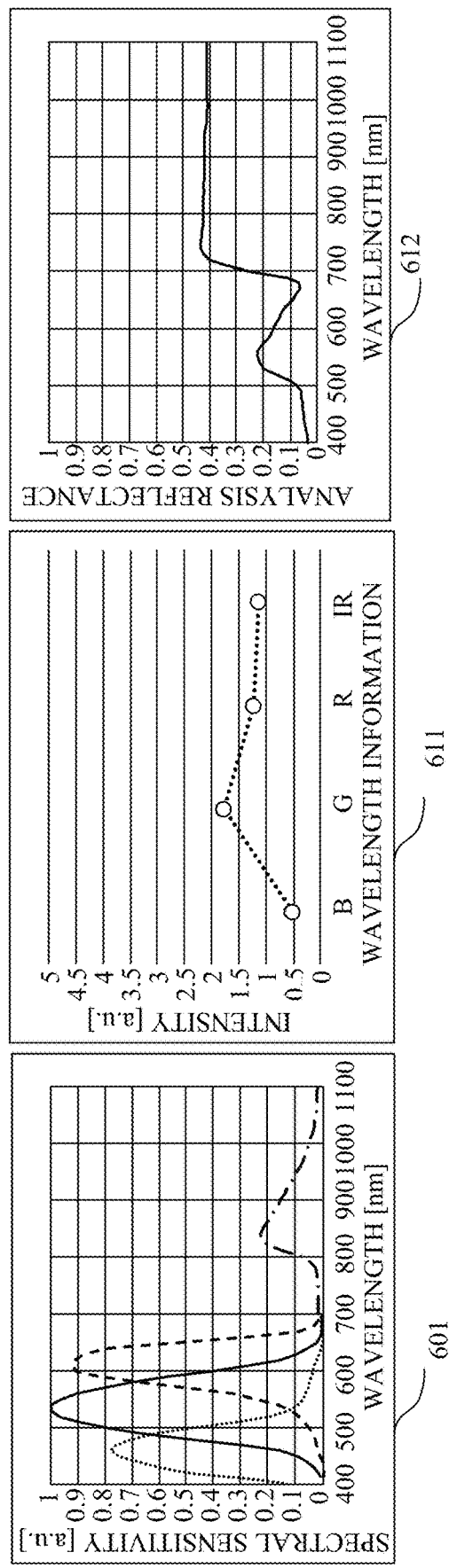
FIG. 6 illustrates a spectral characteristic of a spectroscope according to an example 1, information acquired by the spectroscope, and an estimated spectrum.

Referring now to FIG. 6, a description will be given of an example 1 according to the present invention. FIG. 6 illustrates a spectral characteristic 601 of the spectroscope, spectral information 611 acquired by the spectroscope, and an estimated spectrum 612 estimated from the spectral information 611. In the spectral characteristic 601, the abscissa axis represents a wavelength and the ordinate axis represents a spectral intensity. In the spectral information 611, the abscissa axis represents wavelength information and the ordinate axis represents an intensity. In the estimated spectrum 612, the abscissa axis represents a wavelength and the ordinate axis represents an analytical reflectance.

As illustrated in the spectral characteristic 601, the spectroscope according to this example has four pieces of information of blue (B) of a dotted line, green (G) of a solid line, red (R) of a broken line, and infrared (IR) of an alternate long and short dash line. In other words, the spectroscope according to this example can acquire four points of information like the spectral information 611 as the spectrum 101.

Table 1 shows coefficients $k(k_1, k_2, k_3)$ in the expression (5) relating to B, G, R, and IR in this example. Table 2 shows average values $C_{avg}$ of each of B, G, R and IR. Using the coefficient k and the average value $C_{avg}$ can provide matrix and simultaneous equations, as represented by the following expression (6).

$$\begin{pmatrix} B_n \\ G_n \\ R_n \\ IR_n \end{pmatrix} - \begin{pmatrix} C_{avgb} \\ C_{avgg} \\ C_{avgr} \\ C_{avgir} \end{pmatrix} = \begin{pmatrix} k_{1b} & k_{2b} & k_{3b} \\ k_{1g} & k_{2g} & k_{3g} \\ k_{1r} & k_{2r} & k_{3r} \\ k_{1ir} & k_{2ir} & k_{3ir} \end{pmatrix} \begin{pmatrix} t_{1n} \\ t_{2n} \\ t_{3n} \end{pmatrix} \quad (6)$$

The first term on the left side in the expression (6) is spectral information 611 acquired by the spectroscope according to this example, the second term is shown in Table 2, and the coefficients on the right side are shown in Table 1. The spectral information 611 corresponding to the spectrum 101 enables the numerical values of t1=0.311, t2=−0.089, t3=−0.007 to be derived in the expression (6). The spectrum f(λ) is obtained with these values and the following expression (7).

$$f(\lambda) = t_1 \cdot p_1 + t_2 \cdot p_2 + t_3 + p_{avg} \quad (7)$$

Each basis vector p and average value $p_{avg}$ utilize values provided in the following numerical examples. These calculations provide the estimated spectrum 612. The estimated spectrum 612 and the spectrum 101 have a very high correlation, and a correlation coefficient of 0.99 is obtained. The calculated absolute values of the variable term $t_1 \cdot p_1 +$ $t_2 \cdot p_2 + t_3 \cdot p_3$ for the estimated spectrum 612 and the value of the numerical example as the constant term are set such that it is confirmed that the absolute value of the constant term according to the numerical example is large in all wavelength regions. It can be understood that the constant term is generally used and only the variable term maintains the estimation accuracy.

One of the material analysis technology of the estimated spectrum 612 derives a value of NDVI (normalized vegetation index) using a simple expression. NDVI is generally used as an index of the leaf vegetation and growth degree, and known to be obtained by the following expression (8).

$$NDVI = \frac{IR - R}{IR + R} \quad (8)$$

In the expression (8), IR is a near-infrared reflectance, and R is a reflectance of a red wavelength. For the leaf, red is the wavelength used for the photosynthesis, and IR is a reflective area showing the growth degree depending on the leaf structure. When it is assumed that R is a wavelength of 650 nm and IR is a wavelength of 850 nm from the estimated spectrum, the object 100 has NDVI of 0.64.

Example 2

Figure 7:
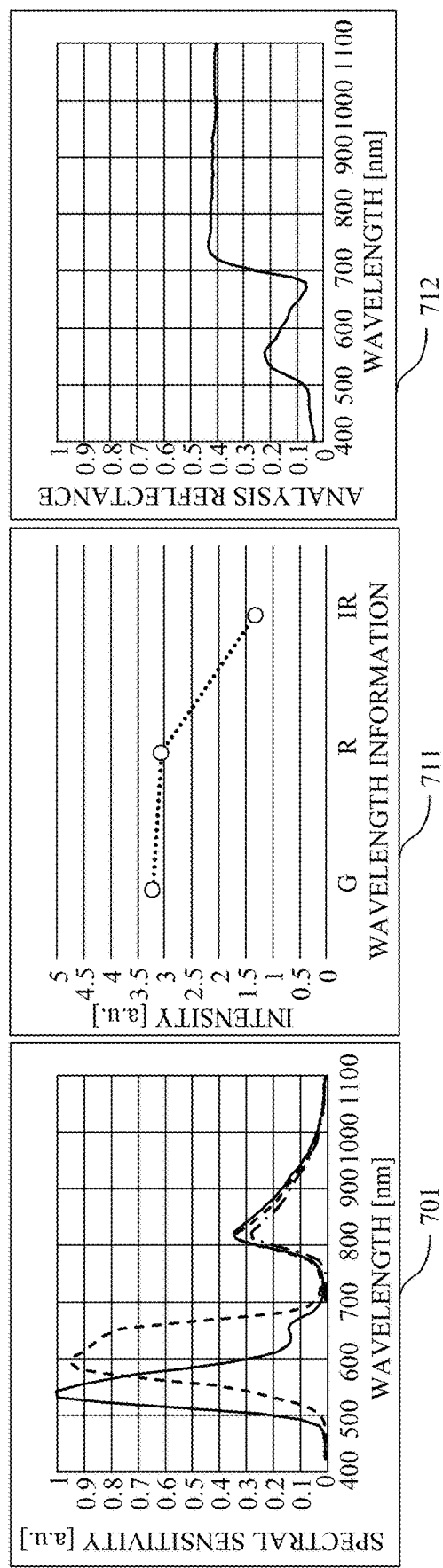
FIG. 7 illustrates a spectral characteristic of the spectroscope according to an example 2, information acquired by the spectroscope, and an estimated spectrum.

Referring now to FIG. 7, a description will be given of an example 2 according to the present invention. FIG. 7 illustrates a spectral characteristic 701 of the spectroscope, spectral information 711 acquired by the spectroscope, and estimated spectrum 712 estimated from the spectral information 711. In the spectral characteristic 701, the abscissa axis represents a wavelength and the ordinate axis indicates a spectral intensity. In the spectral information 711, the abscissa axis represents wavelength information and the ordinate axis represents an intensity. In the estimated spectrum 712, the abscissa axis represents a wavelength and the ordinate axis represents an analytical reflectance.

As illustrated in the spectral characteristic 701, the spectroscope according to this example can acquire three pieces of information of green (G) of a solid line, red (R) of a broken line, infrared (IR) of an alternate long and short dash line. In other words, the spectroscope according to this example can acquire three points of information as the spectrum 101 like the spectral information 711.

Table 3 shows the coefficients $k(k_1, k_2, k_3)$ in the expression (5) relating to G, R, and IR in this example. Table 4 shows average values $C_{avg}$ of each of G, R, and IR. The analysis pursuant to the expression (6) provides numerical values of $t_1 = 0.305$, $t_2 = -0.100$, and $t_3 = -0.008$. The calculation using these values and the expression (7) provides the estimated spectrum 712. The estimated spectrum 712 and the spectrum 101 have a very high correlation, and a correlation coefficient of 0.99 is obtained.

This example once converts the spectral information 711 into scores $t_1$, $t_2$, and $t_3$ having low direct correlations with the spectral characteristic 701. This corresponds to outputting the same scores $t_1$, $t_2$, and $t_3$ for the spectral information of the same object 100, regardless of the shape or sensitivity of the spectral characteristic 701. In the examples 1 and 2, the spectrum 101 of the same object 100 is acquired. It can be understood that the spectral characteristics 601 and 701 show shapes different from each other. On the other hand, when the calculated scores $t_1$, $t_2$, $t_3$ are compared, it is understood that the values are very close to those of the examples 1 and 2.

This example provides the analysis such that the absolute values of the vectors $p_1$, $p_2$, and $p_3$ are 1. This is because expressing it as a unit vector is more convenient for explaining the orthogonality of these vectors $p_1$, $p_2$, and $p_3$ or the like It is assumed that the vectors $p_1$, $p_2$, and $p_3$ are unit vectors and the scores $t_1$, $t_2$, and $t_3$ are arranged in descending order of the compression contribution ratio, the score $t_1$ is likely to have the maximum absolute value. On the other hand, the scores $t_2$ and $t_3$ have low contribution ratios and serves as a fine adjustment.

In this example, the error (permissible error or tolerance) of the absolute value of the score $t_1$ having the highest contribution ratio may be 30% or less regardless of the shape of the spectral characteristic 701 or the spectroscope. In other words, when the score $t_1$ is 0.311, absolute values of ±30% are taken as permissible values, which are values from 0.218 to 0.404. Comparing the examples 1 and 2 with each other, the score $t_1$ having the maximum value falls within a predetermined range.

It is effective for this example to increase the efficiency of the compression technology 402 in order to reduce the error by 30% or less so as to mitigate the influence of the spectral characteristic 701. The devised compression technology 402 can adjust the contribution ratios of the scores $t_1$, $t_2$, and $t_3$. Devising means will be described in detail for the following example 3. Since the scores $t_2$ and $t_3$ with low contribution ratios are adjustment terms for obtaining the estimated spectrum 712, the values may differ greatly depending on spectroscopes. In this example, the object 100 has NDVI of 0.64, and a result very close to that in the example 1 can be obtained.

Comparative Example

The comparative example calculates the NDVI using information on the spectroscopes illustrated in the examples 1 and 2. In general, the NDVI obtained by the expression (8) sets the infrared information as IR and red information as R regardless of the shape of spectral characteristics. With IR and R information of the spectral information 611 and 711, the NDVI of the spectroscope according to the example 1 of 0.37 is significantly different from that of the example 2 of −0.40. This difference largely depends on the shapes and sizes of the spectral characteristics 601 and 701, and is caused particularly by the low sensitivity to the IR in the example 2.

The conventional method is significantly influenced by the spectral characteristics 601 and 701 of the spectroscopes, and the results of the material analyses are not the same even for the same object 100. It was thus necessary to separately construct the analysis technology for each of the spectroscopes according to the examples 1 and 2. On the other hand, the examples 1 and 2 can obtain substantially the same value using the common analysis technology.

Example 3

Referring now to FIG. 2, a description will be given of an example 3 according to the present invention. FIG. 2 illustrates a spectral characteristic 201 of the spectroscope, spectral information 211 acquired by the spectroscope, and an estimated spectrum 212 estimated from the spectral information 211. As illustrated in the spectral characteristic 201 of the spectroscope according to this example, three pieces of information of blue (B) of a dotted line, green (G) of a solid line, and red (R) of a broken line can be acquired. In other words, the spectroscope according to this example can acquire three points of information like the spectral information 211 as the spectrum 101.

Table 5 shows the coefficients k($k_1$, $k_2$, $k_3$) of the expression (5) relating to B, G, and R in this example. Table 6 shows average values $C_{avg}$ of each of B, G and R. The analysis according to the expression (6) provides numerical values of $t_1$=0.252, $t_2$=0.138, and $t_3$=−0.003. The calculation using these values and the expression (7) provides the estimated spectrum 212. The correlation between the estimated spectrum 212 and the spectrum 101 is very high, and a correlation coefficient of 0.99 is obtained. In this example, the object 100 has NDVI of 0.67, which is very close to that of the example 1.

Figure 8:
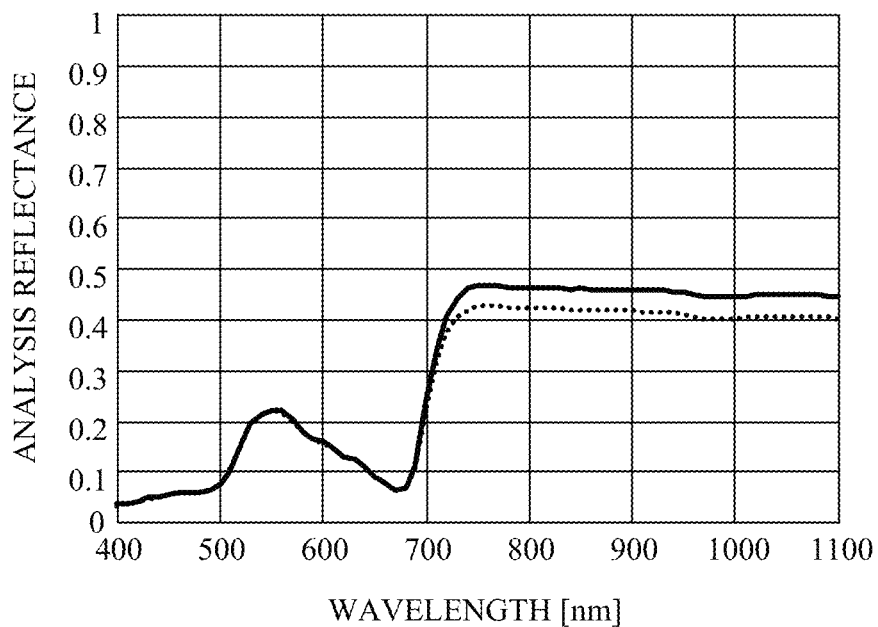
FIG. 8 illustrates an estimated spectrum and a spectrum of an object according to the example 3.

In this example, the values somewhat shift from those in the examples 1 and 2. Referring now to FIG. 8, a description will be given of this shift. FIG. 8 is a graph displaying the estimated spectrum 212 and the spectrum 101 in a superimposed manner. In FIG. 8, a solid line indicates the estimated spectrum 212, and a dotted line indicates the spectrum 101. In FIG. 8, the abscissa axis represents a wavelength and the ordinate axis represents an analytical reflectivity.

As can be understood from FIG. 8, the estimation accuracy is low at the wavelengths of 700 nm or higher in the infrared region. Although there are a variety of causes, it is known that the compression accuracy of the compression technology 402 represented by the expressions (2) and (3) and the regression accuracy of the regression technology 403 represented by the expression (4) are dominant. One influential factor was found to be a residue an in the expression (2). The residual an is a residual remaining for every n samples and has a different value for each spectrum $f_n(\lambda)$ of each sample. On the other hand, it is difficult for the regression expression represented by the expression (4) to consider this residual, and the regression calculation is performed only with the score t. Thus, in order to accurately estimate the original spectrum, it is necessary to increase the compression efficiency so as to make an as low as possible.

Accordingly, this example performs the analysis in order of the spectral information 211, the spectral coefficient t, and the estimated spectrum 212. The conversion from the spectral coefficient t to the estimated spectrum 212 provides the estimated spectrum 212 by "different coefficient processing or a conversion into different information according to each wavelength." For example, assume that the wavelength of 400 to 700 nm is used for the reflectance and the value of the wavelength of 700 to 1100 nm is used for the absorbance (1/log R).

Figure 9:
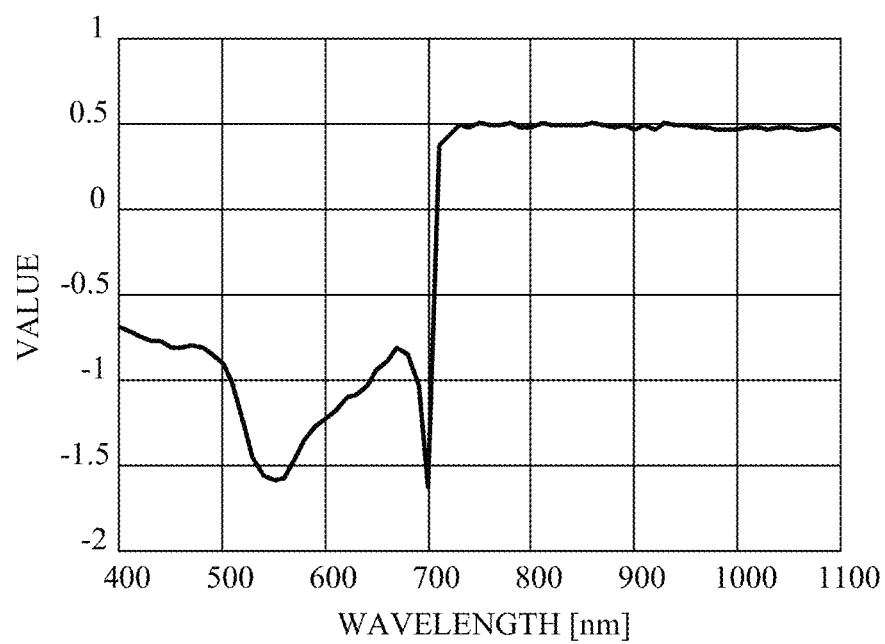
FIG. 9 illustrates a modification of the spectrum according to the example 3.

FIG. 9 illustrates deformed values of the spectrum 101. In FIG. 9, the abscissa axis represents a wavelength and the ordinate axis represents a value. It is conceivable that according to one characteristic of the compression technology 402, the statistical feature of the sample n spectrum f(k) is maintained regardless of whatever conversion is made for each wavelength and variable. Accordingly, even if the spectrum is deformed as illustrated in FIG. 9, the calculation is essentially available as long as it is finally converted into the reflectance R. When the conversion for partial variables is used, the trend can be similar between the visible light region of 400 to 700 nm with a small value but a large dispersion, and the infrared region of 700 to 1100 nm with a small dispersion but a large value. This configuration can improve the compression accuracy of the compression technology 402.

This example uses the principal component analysis for the compression technology 402. With data using a simple reflectance, the compression contribution ratio of score 1 (how much original data could be compressed) is 0.67, but it can be greatly improved to 0.93. In addition to this conversion, a method for multiplying each variable by different coefficients is also effective. For example, the score 1 gains a compression contribution ratio of 0.96 by multiplying the original data 401 by the coefficient "a" illustrated in the numerical example and by performing the compression technology 402. Since the coefficient "a" increases the compression contribution ratio, it can be obtained based on the method of the compression technology.

Figure 10:
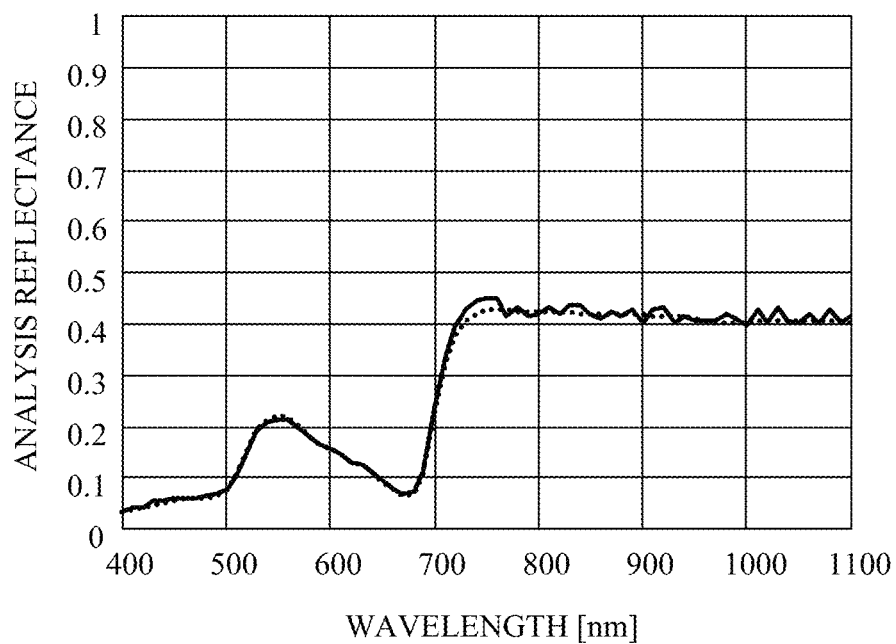
FIG. 10 illustrates an improved estimated spectrum and a spectrum of an object according to the example 3.

FIG. 10 illustrates the estimated spectrum (improved estimated spectrum) obtained by increasing the compression contribution ratio through these methods. In FIG. 10, a solid line indicates an improved estimated spectrum, and a dotted line indicates the spectrum 101. In FIG. 10, the abscissa axis represents a wavelength and the ordinate axis represents an analytical reflectivity. Since noises are somewhat left as FIG. 10 is not completely compressed, it can be understood that the relative superimposition degree improves as compared with the result of FIG. 8. The improved estimated spectrum of FIG. 10 and the spectrum 101 have a very high correlation, and a correlation coefficient of 0.99 is obtained. The object 100 obtained from FIG. 10 has NDVI of 0.64, which is very similar to that in each of the examples 1 and 2.

This example has described in detail the method for eliminating the influence of a in the expression (2), but the present invention is not limited to this method. For example, a method may be used which prepares the original data 401 from which a has been removed, adds the influence of a to the regression expression (4), or constructs the regression expression (4) so that the influence of a is ignorable. These methods express the original data 401 with a small number of variables by the compression technology 402 and express the influence of the spectroscope (imaging apparatus) through the regression technology 403. In particular, the regression expression (4) is suitable to express the influence of spectroscope (imaging apparatus). Thus, in order to improve the contribution ratio and the accuracy, it is not limited to the linear sum expression.

Example 4

Referring now to FIG. 3, a description will be given of an example 4 according to the present invention. FIG. 3 illustrates a spectral characteristics 301 of the spectroscope, spectral information 321 acquired by the spectroscope, and an estimated spectrum 322 estimated from the spectral information 321. As illustrated in the spectral characteristics 301 of the spectroscope according to this example, as illustrated by the spectral characteristic 301, five pieces of information are obtained such as blue (B) of a dotted line, green (G) of a solid line, light green (LG) of a dashed line, orange (O) of a double line, and red (R) of a broken line. In other words, the spectroscope according to this example can acquire five points of information as the spectrum 101 like the spectral information 321.

Table 7 shows the coefficients k($k_1$, $k_2$, $k_3$) of the expression (5) relating to B, G, LG, O, R in this example. Table 8 shows average values $C_{avg}$ of each of B, G, LG, O, and R. The analysis according to the expression (6) performs numerical values of $t_1$=0.250, $t_2$=0.146, and $t_3$=−0.002. The calculation using these values and the expression (7) can provide the estimated spectrum 322. The correlation between estimated spectrum 322 and spectrum 101 is very high, and a correlation coefficient of 0.99 is obtained. In this example, the object 100 has NDVI of 0.67, which is very close to that of the example 1.

Figure 11:
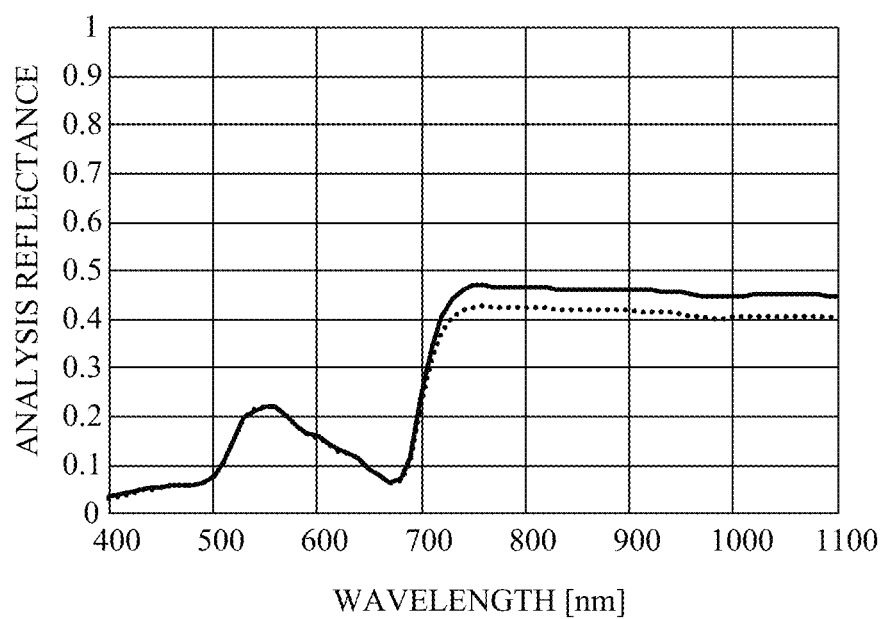
FIG. 11 illustrates an estimated spectrum and a spectrum of an object according to the example 4.

This embodiment has a slight shift in value as in the example 3. Referring now to FIG. 11, a description will be given of this shift. FIG. 11 is a graph displaying the estimated spectrum 322 and the spectrum 101 in a superimposed manner. In FIG. 11, a solid line indicates the estimated spectrum 322, and a dotted line indicates the spectrum 101. In FIG. 11, the abscissa axis represents a wavelength and the ordinate axis represents an analytical reflectivity. It is understood from FIG. 11 that the estimation accuracy is low at the wavelengths of 700 nm or higher in the infrared region, similar to the example 3.

Figure 12:
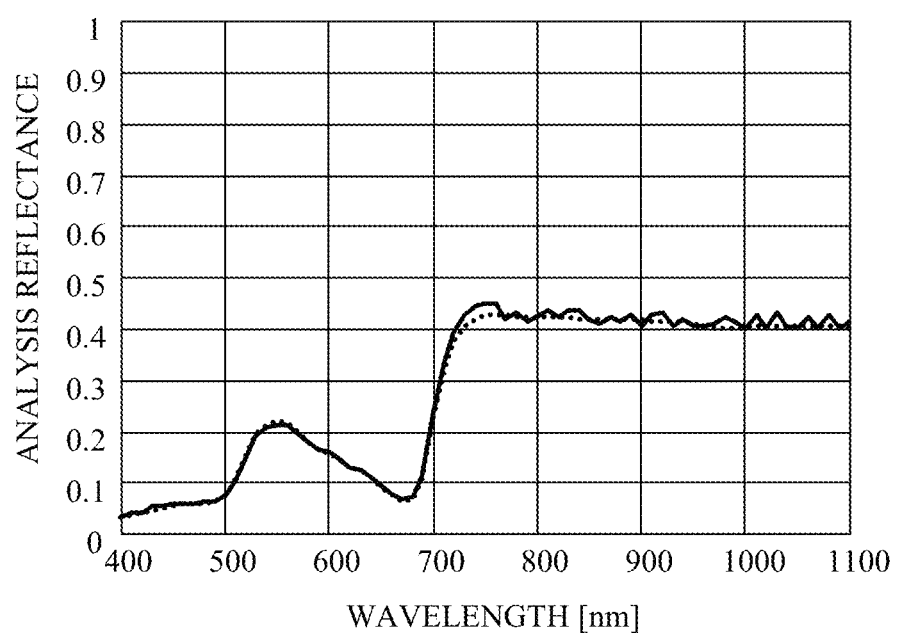
FIG. 12 illustrates an improved estimated spectrum and a spectrum of an object according to the example 4.

Similar to the example 3, this embodiment makes a conversion to improve the compression contribution ratio. FIG. 12 illustrates an estimated spectrum (improved estimated spectrum) obtained by increasing the compression contribution ratio. In FIG. 12, a solid line represents the improved estimated spectrum, and a dotted line represents the spectrum 101. In FIG. 12, the abscissa axis represents a wavelength and the ordinate axis represents an analytical reflectivity. As in the example 3, it can be understood that the estimation accuracy improves in the infrared region. The object 100 obtained from FIG. 12 has NDVI of 0.64, which is very close to those of the examples 1 and 2.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), micro processor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The analysis apparatus according to each example can analyze the feature amount of the object using the same material recognizer and material analyzer, regardless of the spectroscope that acquires the spectral information. Hence, each example can provide an analysis apparatus, an imaging apparatus, and a program, each of which can easily and efficiently analyze an object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, a description was made mainly on the spectral information for the original data 401, but statistically the same type of data is similarly applicable. For example, even when information on different spaces is connected, numerical information such as position information, temperature information, and humidity information can be similarly used.

Numerical Example

| Wavelength | Feature | $p_1$ | $p_2$ | $p^3$ | $P_{ave}$ | a |
|---|---|---|---|---|---|---|
| 400 | 0.03 | 0.00 | 0.00 | 0.14 | 0.04 | −0.91 |
| 410 | 0.04 | 0.01 | 0.00 | 0.27 | 0.04 | 1.64 |
| 420 | 0.04 | 0.01 | 0.01 | 0.22 | 0.04 | 1.08 |
| 430 | 0.05 | 0.02 | 0.02 | 0.18 | 0.04 | 1.01 |
| 440 | 0.05 | 0.02 | 0.02 | 0.05 | 0.05 | 1.05 |
| 450 | 0.06 | 0.03 | 0.02 | 0.16 | 0.05 | 1.27 |
| 460 | 0.06 | 0.03 | 0.02 | 0.07 | 0.05 | 1.55 |
| 470 | 0.06 | 0.04 | 0.02 | 0.25 | 0.05 | 1.67 |
| 480 | 0.06 | 0.04 | 0.02 | 0.20 | 0.05 | 1.75 |
| 490 | 0.07 | 0.05 | 0.02 | 0.24 | 0.05 | 2.09 |
| 500 | 0.08 | 0.07 | 0.02 | −0.01 | 0.06 | 3.13 |
| 510 | 0.11 | 0.12 | 0.03 | 0.18 | 0.07 | 4.40 |
| 520 | 0.16 | 0.19 | 0.04 | −0.04 | 0.10 | 4.47 |
| 530 | 0.20 | 0.22 | 0.06 | 0.10 | 0.13 | 3.87 |
| 540 | 0.22 | 0.24 | 0.07 | 0.09 | 0.15 | 3.54 |
| 550 | 0.22 | 0.25 | 0.07 | −0.08 | 0.15 | 3.53 |
| 560 | 0.22 | 0.26 | 0.07 | −0.13 | 0.15 | 3.82 |
| 570 | 0.20 | 0.25 | 0.06 | −0.17 | 0.13 | 4.35 |
| 580 | 0.18 | 0.24 | 0.05 | 0.12 | 0.11 | 5.06 |
| 590 | 0.17 | 0.23 | 0.04 | 0.01 | 0.10 | 5.56 |
| 600 | 0.16 | 0.22 | 0.04 | 0.06 | 0.10 | 5.78 |
| 610 | 0.15 | 0.20 | 0.03 | 0.14 | 0.09 | 6.17 |
| 620 | 0.13 | 0.18 | 0.03 | −0.07 | 0.08 | 6.72 |
| 630 | 0.13 | 0.17 | 0.03 | 0.01 | 0.08 | 6.93 |
| 640 | 0.11 | 0.15 | 0.02 | −0.04 | 0.07 | 6.59 |
| 650 | 0.09 | 0.11 | 0.02 | 0.00 | 0.06 | 5.84 |
| 660 | 0.08 | 0.08 | 0.02 | 0.04 | 0.06 | 5.15 |
| 670 | 0.06 | 0.05 | 0.02 | 0.25 | 0.05 | 2.93 |
| 680 | 0.07 | 0.05 | 0.02 | 0.16 | 0.06 | 2.65 |
| 690 | 0.11 | 0.13 | 0.02 | 0.21 | 0.08 | 8.42 |
| 700 | 0.23 | 0.30 | 0.04 | −0.16 | 0.16 | 6.90 |
| 710 | 0.32 | 0.31 | 0.07 | 0.01 | 0.26 | 4.48 |
| 720 | 0.37 | 0.23 | 0.09 | −0.20 | 0.34 | 2.50 |
| 730 | 0.41 | 0.13 | 0.12 | −0.10 | 0.40 | 1.07 |
| 740 | 0.42 | 0.04 | 0.14 | −0.12 | 0.43 | 0.31 |
| 750 | 0.43 | −0.01 | 0.15 | −0.04 | 0.45 | −0.03 |
| 760 | 0.43 | −0.03 | 0.16 | 0.13 | 0.45 | −0.16 |
| 770 | 0.43 | −0.03 | 0.16 | 0.07 | 0.45 | −0.20 |
| 780 | 0.43 | −0.03 | 0.16 | 0.07 | 0.45 | −0.21 |
| 790 | 0.43 | −0.03 | 0.16 | −0.03 | 0.45 | −0.21 |
| 800 | 0.43 | −0.04 | 0.16 | −0.01 | 0.45 | −0.21 |
| 810 | 0.42 | −0.04 | 0.16 | 0.09 | 0.45 | −0.22 |
| 820 | 0.42 | −0.04 | 0.16 | −0.08 | 0.45 | −0.22 |
| 830 | 0.42 | −0.04 | 0.16 | 0.01 | 0.45 | −0.22 |
| 840 | 0.42 | −0.04 | 0.16 | 0.09 | 0.45 | −0.23 |
| 850 | 0.42 | −0.04 | 0.16 | −0.15 | 0.45 | −0.24 |
| 860 | 0.42 | −0.04 | 0.16 | 0.09 | 0.45 | −0.24 |
| 870 | 0.42 | −0.04 | 0.16 | 0.13 | 0.45 | −0.25 |
| 880 | 0.42 | −0.04 | 0.16 | −0.14 | 0.45 | −0.25 |
| 890 | 0.42 | −0.04 | 0.16 | −0.10 | 0.45 | −0.25 |
| 900 | 0.42 | −0.04 | 0.16 | 0.09 | 0.45 | −0.25 |
| 910 | 0.42 | −0.04 | 0.16 | −0.02 | 0.45 | −0.26 |
| 920 | 0.42 | −0.04 | 0.16 | 0.00 | 0.45 | −0.26 |
| 930 | 0.42 | −0.04 | 0.16 | −0.11 | 0.45 | −0.26 |
| 940 | 0.42 | −0.04 | 0.16 | −0.02 | 0.45 | −0.26 |
| 950 | 0.41 | −0.04 | 0.16 | 0.12 | 0.44 | −0.26 |
| 960 | 0.41 | −0.04 | 0.16 | −0.06 | 0.44 | −0.27 |
| 970 | 0.40 | −0.04 | 0.15 | −0.11 | 0.44 | −0.28 |

-continued

| Wavelength | Feature | $p_1$ | $p_2$ | $p^3$ | $P_{ave}$ | a |
|---|---|---|---|---|---|---|
| 980 | 0.40 | −0.04 | 0.15 | −0.03 | 0.44 | −0.28 |
| 990 | 0.40 | −0.04 | 0.15 | 0.10 | 0.44 | −0.28 |
| 1000 | 0.40 | −0.04 | 0.15 | 0.11 | 0.44 | −0.28 |
| 1010 | 0.41 | −0.04 | 0.16 | 0.00 | 0.44 | −0.29 |
| 1020 | 0.41 | −0.05 | 0.16 | −0.12 | 0.44 | −0.29 |
| 1030 | 0.41 | −0.05 | 0.16 | 0.09 | 0.44 | −0.29 |
| 1040 | 0.41 | −0.05 | 0.16 | 0.09 | 0.44 | −0.29 |
| 1050 | 0.41 | −0.05 | 0.16 | −0.01 | 0.44 | −0.29 |
| 1060 | 0.41 | −0.05 | 0.16 | −0.08 | 0.44 | −0.29 |
| 1070 | 0.41 | −0.05 | 0.16 | −0.11 | 0.44 | −0.29 |
| 1080 | 0.41 | −0.05 | 0.16 | −0.07 | 0.44 | −0.29 |
| 1090 | 0.41 | −0.05 | 0.16 | 0.11 | 0.44 | −0.30 |
| 1100 | 0.40 | −0.05 | 0.16 | −0.05 | 0.44 | −0.30 |

TABLE 1

|  | $k_1$ | $k_2$ | $k_3$ |
|---|---|---|---|
| B | 0.395 | 0.165 | 1.329 |
| G | 2.049 | 0.511 | 1.007 |
| R | 1.610 | 0.301 | 3.054 |
| IR | −0.108 | 0.435 | 0.122 |

TABLE 2

|  | $c_{avg}$ |
|---|---|
| B | 0.403 |
| G | 1.187 |
| R | 0.792 |
| IR | 1.203 |

TABLE 3

|  | $k_1$ | $k_2$ | $k_3$ |
|---|---|---|---|
| G | 1.671 | 1.078 | 0.762 |
| R | 1.643 | 0.971 | 4.139 |
| IR | −0.124 | 0.508 | 0.140 |

TABLE 4

|  | $c_{avg}$ |
|---|---|
| G | 2.813 |
| R | 2.698 |
| IR | 1.404 |

TABLE 5

|  | $k_1$ | $k_2$ | $k_3$ |
|---|---|---|---|
| B | 0.395 | 0.165 | 1.329 |
| G | 2.049 | 0.511 | 1.007 |
| R | 1.610 | 0.301 | 3.054 |

TABLE 6

|  | $c_{avg}$ |
|---|---|
| B | 0.403 |
| G | 1.187 |
| R | 0.792 |

TABLE 7

|  | $k_1$ | $k_2$ | $k_3$ |
|---|---|---|---|
| B | 0.297 | 0.154 | 1.553 |
| G | 1.233 | 0.335 | 0.647 |
| LG | 1.227 | 0.289 | 0.123 |
| O | 0.452 | 0.079 | 0.833 |
| R | 0.505 | 0.084 | 1.676 |

TABLE 8

|  | $c_{avg}$ |
|---|---|
| B | 0.389 |
| G | 0.771 |
| LG | 0.664 |
| O | 0.207 |
| R | 0.250 |

This application claims the benefit of Japanese Patent Application No. 2018-82119, filed on Apr. 23, 2018, which is hereby incorporated by reference herein in its entirety.

What is claimed is:

1. An analysis apparatus comprising:
one or more processors configured to execute:
first estimation processing to estimate first spectral information of an object based on first information acquired by a first spectroscope;
second estimation processing to estimate second spectral information of the object based on second information acquired by a second spectroscope;
first regression processing to tag the first spectral information with a feature amount of the object; and
second regression processing to tag the second spectral information with the feature amount,
wherein the first estimation processing and the second estimation processing are different from each other,
wherein first regression processing and the second regression processing are common to each other; and
wherein, in the first and second regression processing, it is determined whether the object is a predetermined object based on the first and second spectral information.

2. The analysis apparatus according to claim 1, wherein the first information and the second information are first and second images of the object.

3. The analysis apparatus according to claim 1, wherein the first spectral information and the second spectral information are first and second spectra of the object.

4. The analysis apparatus according to claim 1, wherein the first spectral information and second spectral information are first and second spectral coefficients of the object.

5. The analysis apparatus according to claim 4, wherein each of the first and second spectral coefficients is a coefficient representing a characteristic of a wavelength of reflection light or transmission light of the object.

6. The analysis apparatus according to claim 4, wherein, in the first and second estimation processing, the first and second spectral coefficients are estimated by performing four arithmetic operations for the first and second information, respectively.

7. The analysis apparatus according to claim 6, wherein each of first and second expressions is used to estimate the first and second spectral coefficients-are tagged by a linear regression.

8. The analysis apparatus according to claim 4, wherein in the first and second estimation processing, the first and second spectra of the object are estimated based on the first and second spectral coefficients according to a wavelength of reflection light or transmission light of the object, respectively.

9. The analysis apparatus according to claim 4, wherein the spectral coefficient having the highest contribution ratio out of the first and second spectral coefficients has a permissible error of 30% or less.

10. The analysis apparatus according to claim 1, wherein the feature amount is property information of the object.

11. The analysis apparatus according to claim 1, wherein, in the first and second estimation processing, each of the first and second spectral information is estimated based on a variable term obtained by removing a constant term from each of the first and second information.

12. The analysis apparatus according to claim 11, wherein an absolute value of the variable term is smaller than an absolute value of the constant term.

13. An imaging system comprising:
an analysis apparatus; and
a spectroscope configured to acquire information,
wherein the analysis apparatus comprises:
one or more processors configured to execute:
first estimation processing to estimate first spectral information of an object based on first information acquired by a first spectroscope;
second estimation processing to estimate second spectral information of the object based on second information acquired by a second spectroscope;
first regression processing to tag the first spectral information with a feature amount of the object; and
second regression processing to tag the second spectral information with the feature amount,
wherein the first estimation processing and the second estimation processing are different from each other,
wherein first regression processing and the second regression processing are common to each other.

14. A non-transitory computer-readable storage medium storing a program that causes a computer to execute a method that includes:
a first estimation step of estimating first spectral information of an object based on first information acquired by a first spectroscope;
a second estimation step of estimating second spectral information of the object based on second information acquired by a second spectroscope;
a first regression step of tagging the first spectral information with a feature amount of the object; and
a second regression step of tagging the second spectral information with the feature amount,
wherein the first estimation step and the second estimation step are different from each other,
wherein the first regression step and the second regression step are common to each other, and
wherein, in the first and second regression steps, it is determined whether the object is a predetermined object based on the first and second spectral information.

* * * * *